United States Patent
Heyne et al.

(10) Patent No.: US 10,759,293 B2
(45) Date of Patent: Sep. 1, 2020

(54) GALVANIC ISOLATION IN THE POWER ELECTRONICS SYSTEM IN A CHARGING STATION OR ELECTRICITY CHARGING STATION

(71) Applicants: Dr. Ing. h.c. F. Porsche Aktiengesellschaft, Stuttgart (DE); ads-tec GmbH, Nürtingen (DE)

(72) Inventors: Raoul Heyne, Wiernsheim (DE); Florian Joslowski, Leinfelden-Echterdingen (DE); Michael Kiefer, Stuttgart (DE); Thomas Speidel, Markgröningen (DE); Ali Natour, Hochdorf (DE)

(73) Assignees: Dr. Ing. h.c. F. Porsche Aktiengesellschaft (DE); ads-tec GmbH (DE)

( * ) Notice: Subject to any disclaimer, the term of this patent is extended or adjusted under 35 U.S.C. 154(b) by 0 days.

(21) Appl. No.: 16/152,664

(22) Filed: Oct. 5, 2018

(65) Prior Publication Data

US 2019/0106000 A1    Apr. 11, 2019

(30) Foreign Application Priority Data

Oct. 6, 2017 (DE) .................. 10 2017 217 758

(51) Int. Cl.
*B60L 53/20* (2019.01)
*B60L 53/10* (2019.01)
(Continued)

(52) U.S. Cl.
CPC ............... *B60L 53/20* (2019.02); *B60L 53/11* (2019.02); *B60L 53/14* (2019.02); *B60L 53/30* (2019.02);
(Continued)

(58) Field of Classification Search
CPC .. B60L 2210/10; B60L 2210/30; B60L 53/11; B60L 53/14; B60L 53/20;
(Continued)

(56) References Cited

U.S. PATENT DOCUMENTS 10,131,239 B2    11/2018    Herke et al.
2013/0162032 A1    6/2013    Matt
(Continued)

FOREIGN PATENT DOCUMENTS

DE    102011056377 A1    1/2013
DE    102012212291 A1    2/2014
(Continued)

OTHER PUBLICATIONS

German Search Report for German Application No. 10 2017 217 758.6, dated Aug. 3, 2018, with partial translation—7 pages.

*Primary Examiner* — Vuthe Siek
(74) *Attorney, Agent, or Firm* — RatnerPrestia

(57) ABSTRACT

A galvanic isolation in the power electronics system of an electricity charging station having the following features: a rectifier (11) for connection of the charging station (10) to a public low-voltage network and a galvanically isolating DC voltage converter (12) having a high clock frequency and connected to the rectifier (11) and a corresponding electricity charging station.

5 Claims, 1 Drawing Sheet

(51) Int. Cl.
  *B60L 53/14*  (2019.01)
  *B60L 53/53*  (2019.01)
  *B60L 53/30*  (2019.01)
  *H02J 7/00*  (2006.01)
  *H02J 7/02*  (2016.01)
(52) U.S. Cl.
  CPC ............ *B60L 53/53* (2019.02); *H02J 7/0029* (2013.01); *B60L 2210/10* (2013.01); *B60L 2210/30* (2013.01)
(58) Field of Classification Search
  CPC ........ B60L 53/30; B60L 53/53; H02J 7/0029; H02J 7/00; H02J 7/02; H02J 7/022
  See application file for complete search history.

(56) References Cited

U.S. PATENT DOCUMENTS

| | | | |
|---|---|---|---|
| 2013/0175990 A1 | 7/2013 | Jung et al. | |
| 2014/0103863 A1* | 4/2014 | Fassnacht | H02M 1/4225 320/107 |
| 2015/0016159 A1* | 1/2015 | Deboy | H02J 3/383 363/71 |
| 2015/0312020 A1* | 10/2015 | Rombach | H04L 7/0008 375/354 |
| 2015/0375628 A1 | 12/2015 | Biagini et al. | |
| 2016/0121735 A1 | 5/2016 | Sugano | |
| 2017/0120772 A1* | 5/2017 | Alser | H02J 7/0019 |
| 2017/0240063 A1 | 8/2017 | Herke et al. | |
| 2019/0305688 A1* | 10/2019 | Seymour | H02J 13/0096 |

FOREIGN PATENT DOCUMENTS

| | | |
|---|---|---|
| DE | 102014013039 A1 | 3/2015 |
| DE | 102015214236 A1 | 2/2017 |
| DE | 102017208360 A1 | 2/2018 |
| WO | 2013039753 A1 | 3/2013 |
| WO | 2013159821 A1 | 10/2013 |
| WO | 2014130046 A1 | 8/2014 |

* cited by examiner

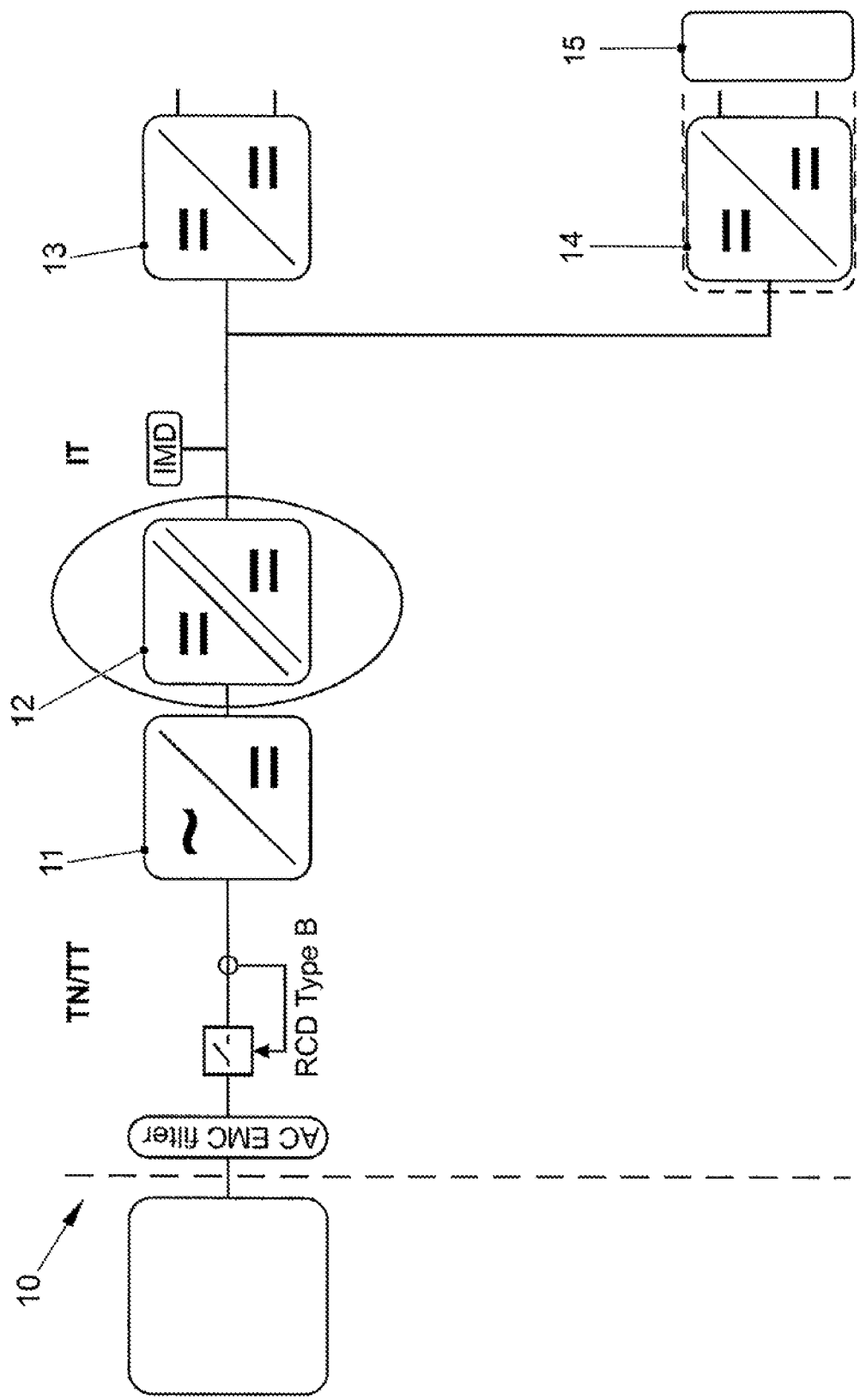

GALVANIC ISOLATION IN THE POWER ELECTRONICS SYSTEM IN A CHARGING STATION OR ELECTRICITY CHARGING STATION

CROSS-REFERENCE TO RELATED APPLICATION

This application claims priority to German Patent Application No. DE 10 2017 217 758.6, filed Oct. 6, 2017, the contents of such application being incorporated by reference herein in their entirety.

FIELD OF THE INVENTION

The present invention relates to a galvanic isolation in the power electronics system of an electricity charging station. The present invention also relates to a corresponding charging station or electricity charging station.

BACKGROUND OF THE INVENTION

In electrical engineering, any stationary device or electrical system that serves for supplying energy to mobile, battery-operated units, machines or motor vehicles by way of simple setting or insertion without it being necessary for the energy storage—for example the traction battery of an electric automobile—to be removed compulsorily is referred to as a charging station. Charging stations for electric automobiles are also sometimes referred to as "electricity charging stations" and can comprise a plurality of charging points.

Known here in particular are direct-current fast charging/high-performance charging (HPC) systems such as the so-called combined charging system (CCS), which is widespread in Europe. In the case of direct-current charging of the generic type, direct current is fed from the charging column directly into the vehicle and, for this purpose, is provided by way of a powerful rectifier from the electricity network or by way of large buffer accumulators at solar charging stations, for example. Situated in the vehicle is a battery management system, which communicates with the charging column directly or indirectly in order to adapt the current intensity, or to terminate the process when a capacity limit is reached.

The power electronics system is usually located in this case in the charging column. Since the direct-current connections of the charging column are connected directly to corresponding connections of the traction battery, it is possible for high charging currents to be transmitted with little loss, which allows short charging times.

In the various charging stations used worldwide, a wide variety of topologies are used for the power electronics system. State safety standards, such as DIN EN 61851-23, in this case occasionally require a galvanic isolation of the charging columns. Said galvanic isolation can be performed in the various charging columns in a wide variety of ways, for example by way of a separate transformer, and also within various converters, such as an AC/DC rectifier having a transformer, for example. A very small design that takes up little space and has a low weight is desirable for galvanic isolation.

Most modern charging columns implement a galvanic isolation at the input converter, the AC/DC converter having an integrated or upstream transformer. Others produce the galvanic isolation in a DC/DC converter as well. To this end, output-side DC/DC converters are usually used; however, these are very expensive due to high powers. Further solutions make provision for the use of the galvanic isolation from the transformer in the network connection. It is also possible for an additional separate transformer to be added on the AC side.

DE102014013039A1, US2013162032A, US2013175990A and US2015375628A, all of which are incorporated by reference herein, each disclose a charging column for an electric vehicle having a space-saving construction and galvanic isolation, for which purpose a DC/DC converter is sometimes provided. The charging columns according to US2013175990A and US2015375628A each contain a plurality of converters, among which is an AC/DC converter.

SUMMARY OF THE INVENTION

The invention provides a galvanic isolation in the power electronics system in a charging station for an electricity charging station and a corresponding electricity charging station according to the independent claims.

The galvanic isolation is technically implemented in a DC/DC controller having a high clock frequency directly downstream of the AC/DC controller provided on the network side. At this position, only the comparatively low network power has to be transmitted, for which reason said power is appropriate for a galvanic isolation, which is intended to be performed in a very space-saving and efficient manner. This is the main aim of the measure proposed here for galvanic isolation, which can also be realized in an easy and advantageous manner in respect of the low installation space requirements.

Further advantageous configurations of the invention are specified in the dependent patent claims. A realization as a series resonant converter, the magnitudes of which in respect of the high clock frequency are minimized and which have the greatest possible efficiency, is thus sensible. In this arrangement, the galvanic isolation is possible in a particularly space-saving and advantageous manner.

BRIEF DESCRIPTION OF THE DRAWING

One exemplary embodiment of the invention is illustrated in the drawing and is described in more detail below.

The single FIGURE shows a converter configuration according to aspects of the invention.

DETAILED DESCRIPTION OF THE INVENTION

The FIGURE illustrates by way of example an electricity charging station equipped with a charging station (10) according to aspects of the invention. A rectifier (AC/DC converter 11) serves here for connection to the public TN or TT low-voltage network. A galvanically isolating DC/DC controller or DC voltage converter (isolated DC/DC converter 12) connected to said rectifier (11) transmits the voltage for protection against ground faults to the internal IT network of the charging station (10) in accordance with any legal requirements. To this end, the converter (12) is designed for operation with the highest possible clock frequency (in technical terms: "high-clocking;" i.e., 30 kHz to 120 kHz and preferably, when using galvanic isolation, 80 kHz to 120 kHz).

At this location, essentially two power paths split up inside the charging station (10): A first DC chopper (13) feeds a connected battery (not illustrated) and allows the energy stored in such a way to be fed back for the accelerated charging of connected vehicles. The battery may include multiple battery sections/strings (e.g., two) with each section/string including multiple modules connected in series and each module including multiple cells connected in series. For the supply of power to said connected vehicles, a second DC chopper (14) having a DC EMC filter (15) connected downstream and a second DC voltage converter, preferably operated in discontinuous conduction mode (DCM), are provided, which second DC chopper and second DC voltage converter have suitably protected connection lines for the purpose of power transmission. The associated pilot line can be provided with an overvoltage protection system depending on the charging standard and the charging voltage.

What is claimed is:

1. A charging station for an electricity charging station, comprising:
   a rectifier for connection of the charging station to a public low-voltage network;
   a galvanically isolating DC voltage converter having a high clock frequency and connected to the rectifier;
   a first DC chopper connected to the galvanically isolating DC voltage converter for connection of a battery to the charging station; and
   a second DC chopper connected to the galvanically isolating DC voltage converter for connection of an electric automobile to the charging station.

2. The charging station as claimed in claim 1, wherein:
   the galvanically isolating DC voltage converter is a series resonant converter.

3. An electricity charging station, comprising:
   a charging station as claimed in claim 2.

4. The electricity charging station as claimed in claim 3, further comprising:
   a battery connected to the first DC chopper.

5. The electricity charging station as claimed in claim 4, wherein:
   the battery comprises a plurality of strings.

* * * * *